(12) United States Patent
Takechi et al.

(10) Patent No.: US 10,892,523 B2
(45) Date of Patent: Jan. 12, 2021

(54) AQUEOUS ELECTROLYTE WITH CARBONATE AND BATTERIES USING THE SAME

(71) Applicant: Toyota Motor Engineering & Manufacturing North America, Inc., Erlanger, KY (US)

(72) Inventors: Kensuke Takechi, Ann Arbor, MI (US); Ruidong Yang, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 94 days.

(21) Appl. No.: 15/335,563

(22) Filed: Oct. 27, 2016

(65) Prior Publication Data

US 2018/0123171 A1    May 3, 2018

(51) Int. Cl.
*H01M 6/16*    (2006.01)
*H01M 4/13*    (2010.01)
(Continued)

(52) U.S. Cl.
CPC ..... *H01M 10/0568* (2013.01); *H01M 2/1613* (2013.01); *H01M 4/131* (2013.01); *H01M 4/485* (2013.01); *H01M 4/505* (2013.01); *H01M 4/525* (2013.01); *H01M 4/623* (2013.01); *H01M 4/625* (2013.01); *H01M 10/0525* (2013.01); *H01M 10/0563* (2013.01); *H01M 10/0569* (2013.01); *H01M 10/36* (2013.01);
(Continued)

(58) Field of Classification Search
None
See application file for complete search history.

(56) References Cited

U.S. PATENT DOCUMENTS

| | | | |
|---|---|---|---|
| 9,184,465 B2 * | 11/2015 | Rosciano | C01F 7/002 |
| 2007/0048607 A1 * | 3/2007 | Nakashima | H01M 2/166 |
| | | | 429/209 |
| 2016/0028127 A1 * | 1/2016 | Ahn | H01M 4/0404 |
| | | | 429/144 |

FOREIGN PATENT DOCUMENTS

WO    2016126737 A1    8/2016

OTHER PUBLICATIONS

Li et al., "Progress in electrolytes for rechargeable Li-based batteries and beyond", Apr. 2016, Green Energy & Environment, vol. 1, Issue 1, pp. 18-42.*

(Continued)

*Primary Examiner* — Cynthia H Kelly
*Assistant Examiner* — Julian Anthony
(74) *Attorney, Agent, or Firm* — Christopher G. Darrow; Darrow Mustafa PC

(57) ABSTRACT

An electrolyte composition has a fluoroalkylsulfonyl salt and water. The water is present, relative to the fluoroalkylsulfonyl salt, at a molar ratio within a range of 0.1:1 to 10:1, inclusive. This creates a "water-in-salt" in which individual water molecules are surrounded by salt rather than vice versa. Water contained in this environment is electrochemically stabilized relative to a bulk water. The electrolyte also has an organic carbonate present, relative to the fluoroalkylsulfonyl salt, at a molar ratio within a range of 0.1:1 to 50:1, inclusive. It has been discovered that inclusion of the organic carbonate further increases the electrochemical stability of the water within the "in-salt" environment.

18 Claims, 6 Drawing Sheets

(51) Int. Cl.
*H01M 4/58* (2010.01)
*H01M 10/0568* (2010.01)
*H01M 10/36* (2010.01)
*H01M 2/16* (2006.01)
*H01M 4/131* (2010.01)
*H01M 4/485* (2010.01)
*H01M 4/505* (2010.01)
*H01M 4/525* (2010.01)
*H01M 4/62* (2006.01)
*H01M 10/0525* (2010.01)
*H01M 10/0563* (2010.01)
*H01M 10/0569* (2010.01)
*H01M 10/052* (2010.01)
*H01M 10/056* (2010.01)
*H01M 4/02* (2006.01)

(52) U.S. Cl.
CPC ........ *H01M 10/052* (2013.01); *H01M 10/056* (2013.01); *H01M 2004/027* (2013.01); *H01M 2004/028* (2013.01); *H01M 2220/20* (2013.01); *H01M 2220/30* (2013.01); *H01M 2300/0002* (2013.01); *H01M 2300/0037* (2013.01); *H01M 2300/0091* (2013.01)

(56) References Cited

OTHER PUBLICATIONS

Suo et al., ""Water-in-salt" electrolyte enables high-voltage aqueous lithium-ion chemistries", Retrieved from the Internet: <http://science.sciencemag.org/>, Retrieved on Sep. 28, 2016, 6 pages.
Suo et al., "Advanced High-Voltage Aqueous Lithium-Ion Battery Enabled by "Water-in-Bisalt" Electrolyte", Wiley Online Library, Angewandte Chemie, International Edition, 2016, pp. 7136-7141 (6 pages).
Suo et al., "Advanced High-Voltage Aqueous Lithium-Ion Battery Enabled by "Water-in-Bisalt" Electrolyte" Angewandte Chemie Supporting Information, 2016, 27 pages.

* cited by examiner

AQUEOUS ELECTROLYTE WITH CARBONATE AND BATTERIES USING THE SAME

TECHNICAL FIELD

The present disclosure generally relates to aqueous electrolyte compositions and, more particularly, to aqueous electrolyte compositions having lithium salt at a very high molar ratio relative to water.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Li-ion secondary batteries dominate the current state-of-the-art for applications requiring mobile power, including electric vehicles and hybrid vehicles, personal electronic devices, and mobile computing applications. This is in part due to the Li-ion cell's rapid and cyclable rechargeability and relatively good power density.

Current state-of-the-art Li-ion batteries typically include a dry (i.e. water-free) organic electrolyte. Because of water's relative incompatibility with, and instability under, typical Li-ion electrochemical conditions, even small amounts of internal water will tend to dramatically decrease battery effectiveness and lifetime. However, the need to ensure dry electrolyte increases battery manufacturing cost.

Many efforts have been made to develop effective Li-ion electrochemistry having aqueous (i.e. water-containing) electrolyte. In one example, high salt concentration electrolyte, so-called "water-in-salt", where electrolyte salt is present in molar excess of water, appears to increase the electrochemical stability of water. However, the electrolyte compositions prepared by this approach will tend to have relatively narrow electric potential windows, thus limiting their application to a variety of desirable anode/cathode combinations.

Accordingly, it would be desirable to provide an improved aqueous electrolyte for a Li-ion cell, the electrolyte being stable and effective across a wide electric potential window.

SUMMARY

This section provides a general summary of the disclosure, and is not a comprehensive disclosure of its full scope or all of its features.

In various aspects, the present teachings provide an electrolyte composition. The electrolyte composition includes: a lithium fluoroalkylsulfonyl salt; and an organic carbonate, present at a first molar ratio, relative to the lithium fluoroalkylsulfonyl salt, within a range of 0.1:1 to 50:1, inclusive. The electrolyte composition also includes water, present at a second molar ratio, relative to the lithium fluoroalkylsulfonyl salt, within a range of 0.1:1 to 10:1.

In other aspects, the present teachings provide a Li-ion cell comprising an anode; a cathode; and an electrolyte composition of the type referred to above.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide an aqueous electrolyte useful as part of a Li-ion battery, and the Li-ion battery having the electrolyte. The unique composition of the electrolyte provides an unusually wide electrochemical window for an aqueous electrolyte. The unusually wide electrochemical window enables the use of anode/cathode compositions not normally usable in conjunction with an aqueous electrolyte due to the relative electrochemical instability of bulk water.

An electrolyte of the present disclosure includes water and a lithium fluoroalkylsulfonyl salt present in an amount relative to one another at a molar ratio within a range of 0.1:1 to 10:1. The high molar ratio of salt to water causes the water to be substantially dispersed within the salt rather than vice versa, as would be the case with a conventional solution. This "water-in-salt" dispersion stabilizes the water against electrochemical decomposition. An electrolyte of the present disclosure further includes an organic carbonate present at a molar ratio relative to the fluoroalkylsulfonyl salt within a range of 0.1:1 to 50:1. It is believed that the organic carbonate further stabilizes the water against electrochemical decomposition, providing an aqueous electrolyte with the widest electric potential window yet known.

Figure 1:
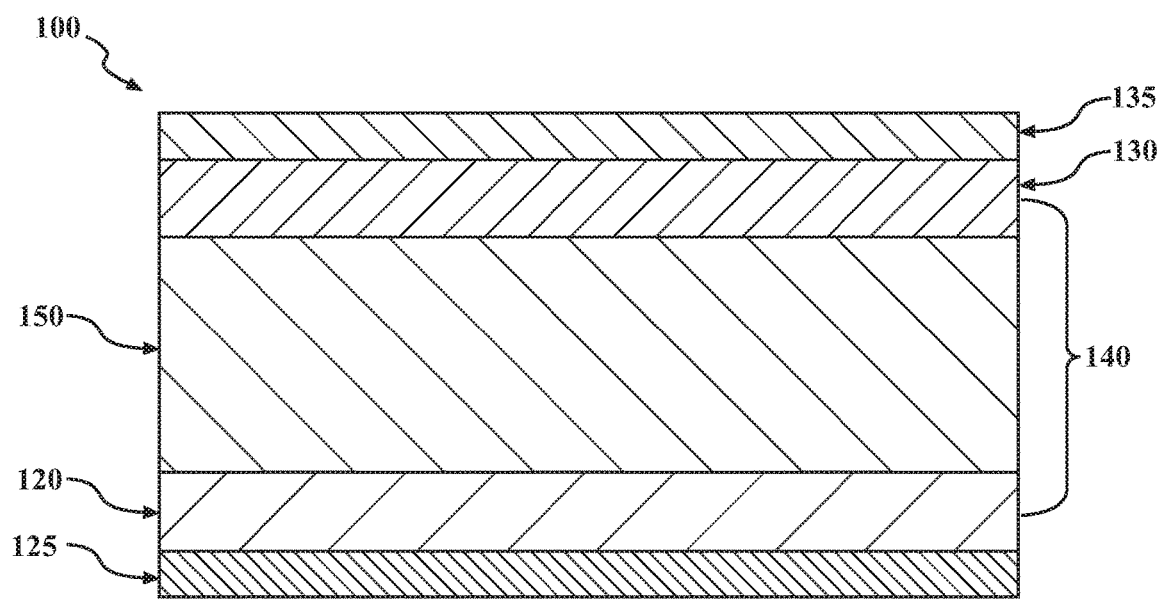
FIG. 1 is a side view of a schematic depiction of an electrochemical cell having an electrolyte composition of the present disclosure.

Thus, and with reference to FIG. 1, a Li-ion cell 100 is disclosed. The Li-ion cell 100 includes an anode 120 in contact with an anode current collector 125. The Li-ion cell 100 further includes a cathode 130 in contact with a cathode current collector 135. The anode 120 and the cathode 130 together define an electrode pair 140, the electrode pair 140 having a theoretical cell potential.

The anode 120 and the cathode 130 are separated by a space that is at least partially filled with an electrolyte composition 150. The anode 120, the cathode 130, and electrolyte composition 150, are configured so that the electrolyte composition 150 places the anode 120 and the cathode 130 in ionic communication with one another. The electrolyte composition 150 can be, but need not necessarily be, infused or impregnated within a porous separator. The anode current collector 125 and the cathode current collector 135 can be placed in electrical communication with one another by means of an external electrical conductor.

The anode 120 can include any kind of anode active material that is compatible with (i) Li-ion cell electrochemistry and (ii) water. Suitable anode materials typically will have reduction potential greater than 0.1 V vs. Li/Li$^+$. Examples of suitable anode materials can include, without limitation, $Li_4Ti_5O_{12}$, $Mo_6S_8$, $Cu_2V_2O_7$, $TiS_4$, $NbS_5$, Li terephthalate ($C_8H_4Li_2O_4$), silicon, sulfur, graphite, and mixtures thereof.

The cathode 130 can include any kind of cathode active material that is compatible with (i) Li-ion cell electrochemistry and (ii) water. Suitable cathode materials typically will have reduction potential less than <5.5 V vs. Li/Li$^+$. Suitable examples of cathode materials can include, without limitation, $LiMn_2O_4$, $LiCoO_2$, $LiFe(PO_4)$, $LiMn_{1/3}Ni_{1/3}Co_{1/3}O_2$, $LiNi_{0.5}Mn_{1.5}O_4$, $LiCoPO_4$, and mixtures thereof.

The electrolyte composition 150 includes the following three components, in admixture with one another:
(i) a fluoroalkylsulfonyl salt,
(ii) an organic carbonate, and
(iii) water.

Figure 2A:
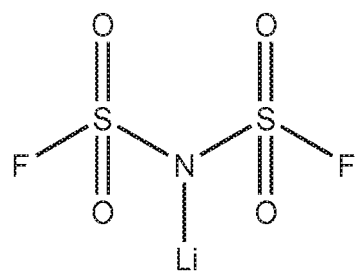
FIG. 2A-2C are chemical line drawings of exemplary lithium fluoroalkylsulfonyl salts described in conjunction with the electrochemical cell of FIG. 1.
Figure 2B:
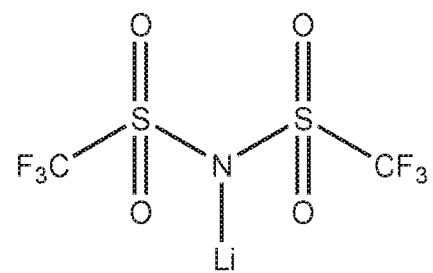
Figure 2C:
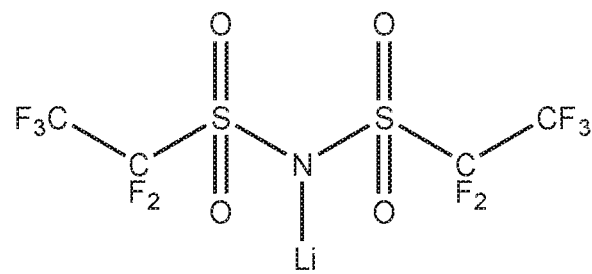

Examples of suitable lithium fluoroalkylsulfonyl salts can include, without limitation: lithium bis(fluorosulfonyl)imide (LiFSI); lithium bis(trifluoromethane)sulfonamide (LiTFSI); lithium bis(perfluoroethanesulfonyl)imide (LiBETI); and mixtures thereof. Chemical line drawings of LiTFSI, LiTFSI, and LiBETI are shown for reference in FIGS. 2A-2C, respectively.

Figure 3A:
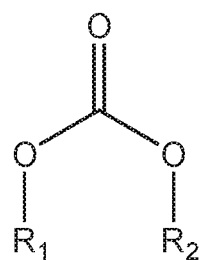
FIGS. 3A-3E are chemical line drawings of exemplary organic carbonates described in conjunction with the electrochemical cell of FIG. 1.
Figure 3B:
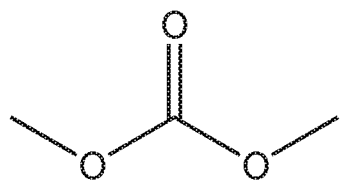
Figure 3C:
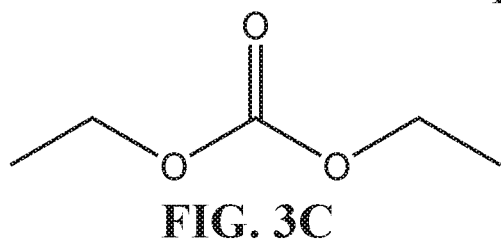
Figure 3D:
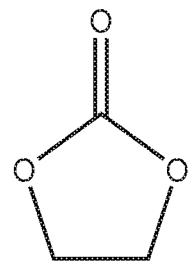
Figure 3E:
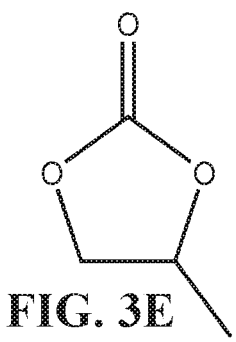

An organic carbonate, as the term is used herein, can alternatively be referred to as a carbonate ester and has a generic formula as shown in FIG. 3A. With reference to FIG. 3A, in some implementations, each of groups $R_1$ and $R_2$ can be, independently, substituted or unsubstituted straight-chain, branched-chain, or cyclic alkyl, or a combination thereof. Suitable examples of such organic carbonates can include, without limitation, dimethyl carbonate (DMC) and diethyl carbonate (DEC). In some implementations, $R_1$ and $R_2$ can be connected to one another, other than via the carbonate ester moiety, such that the organic carbonate is a cyclic organic carbonate. Suitable examples of such cyclic organic carbonates can include, without limitation, ethylene carbonate (EC) and propylene carbonate (PC). Chemical line drawings of DMC, DEC, EC, and PC are shown in FIGS. 3B-3E, respectively.

In an electrolyte composition 150 of the present disclosure, water is present, relative to the fluoroalkylsulfonyl salt, at a molar ratio within a range of 0.5:1 to 20:1, inclusive. In some instances, water is present in the electrolyte composition, relative to fluoroalkylsulfonyl salt, at a molar ratio within a range of 0.5:1 to 5:1, inclusive. In some specific implementations, water is present, relative to the fluoroalkylsulfonyl salt, at a molar ratio of 1:1. In general, the water and the fluoroalkylsulfonyl salt are present in the electrolyte composition 150 at comparable mole fractions, so that the water is substantially dispersed within the salt. Without being bound to any particular theory, it is believed that this dispersal of "water-in-salt" alters the electrochemical properties of the water, relative to those of bulk water, and causes the water to be more stable to electrochemical decomposition.

The organic carbonate is present, relative to the fluoroalkylsulfonyl salt, at a molar ratio within a range of 0.1:1 to 50:1, inclusive. In some implementations, the organic carbonate is present, relative to fluoroalkylsulfonyl salt, at a molar ratio within a range of 0.1:1 to 10:1, inclusive. In some specific implementations, organic carbonate is present relative to fluoroalkylsulfonyl salt at a molar ratio of 1:1. It has been discovered that inclusion of the organic carbonate further increases the electrochemical stability of the water within the "water-in-salt" environment. Without being bound to any particular theory, it is believed that individual organic carbonate molecules may form hydrogen bonds with dispersed water molecules, further isolating individual water molecules and therefore further stabilizing the aqueous component of the electrolyte composition 150 against electrochemical decomposition/electrolysis.

In some implementations, the lithium fluoroalkylsulfonyl salt will be present in the electrolyte composition 150 at a mole fraction of at least 0.1; in other implementations, at a mole fraction of at least 0.2; in other implementations, at a mole fraction of at least 0.3; in other implementations, at a mole fraction of at least 0.4; in other implementations, at a mole fraction of at least 0.5; in other implementations, at a mole fraction of at least 0.6; and in other implementations, at a mole fraction of at least 0.7. In certain exemplary variations discussed below, the lithium fluoroalkylsulfonyl salt is present in the electrolyte composition 150 at a mole fraction of at least 0.3.

Figure 4:
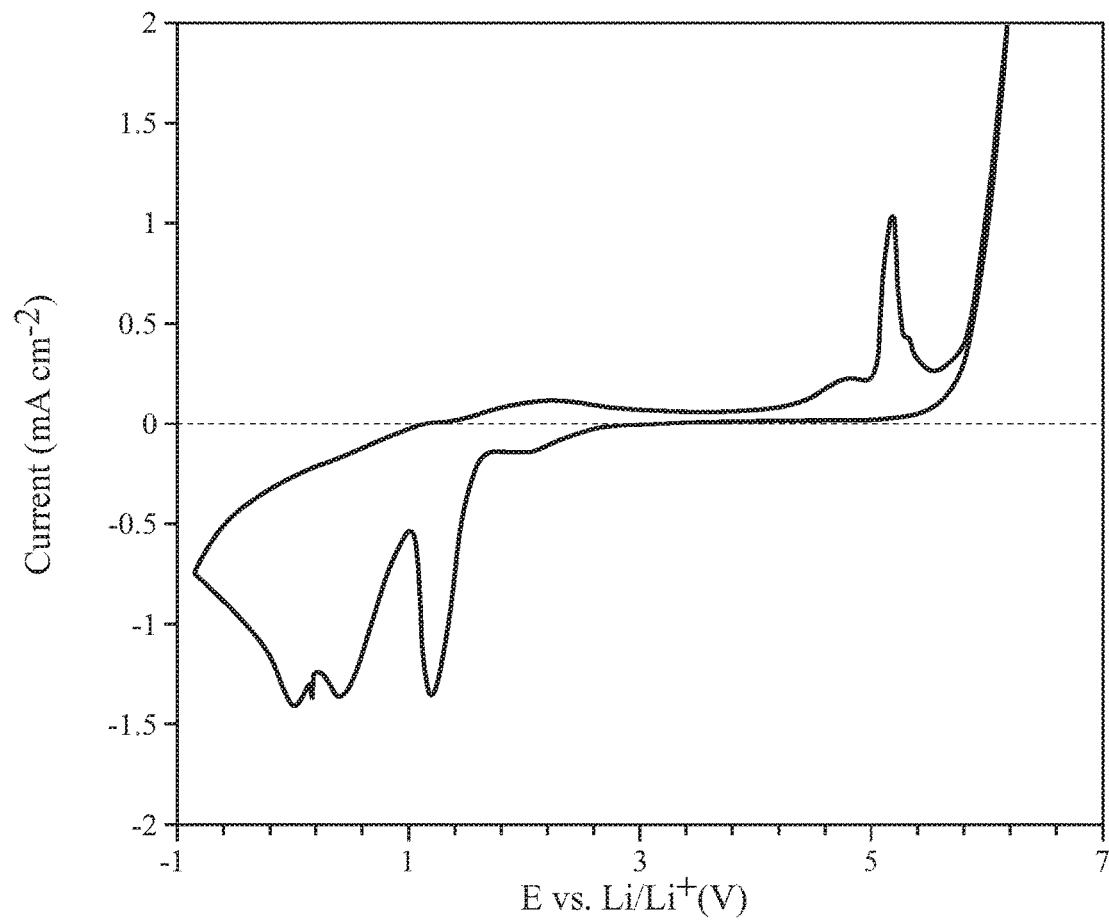
FIG. 4 is a cyclic voltammogram of the electrochemical cell of FIG. 1, where the electrolyte is LiTFSI/DEC/Water present at a 1:1:1 molar ratio.

Referring now to FIG. 4, a cyclic voltammogram is shown for an exemplary Li-ion cell 100 of the present disclosure. The Li-ion cell 100 of FIG. 4 includes an anode having $Li_4Ti_5O_{12}$ as anode active material, and a cathode having $LiNi_{0.5}Mn_{1.5}O_4$ as cathode active material. The Li-ion cell 100 of FIG. 2 further includes an electrolyte composition 140 formed of LiTFSI:DEC:water at a 1:1:1 molar ratio. As shown in FIG. 4, the Li-ion cell 100 exhibits electrochemical stability, as demonstrated by a stable current plateau, across the electric potential window from about 1.6 V to over 5.0 V, during both charge and discharge events. This represents a remarkably wide electric potential window for a Li-ion cell 100 having an aqueous electrolyte.

Figure 5:
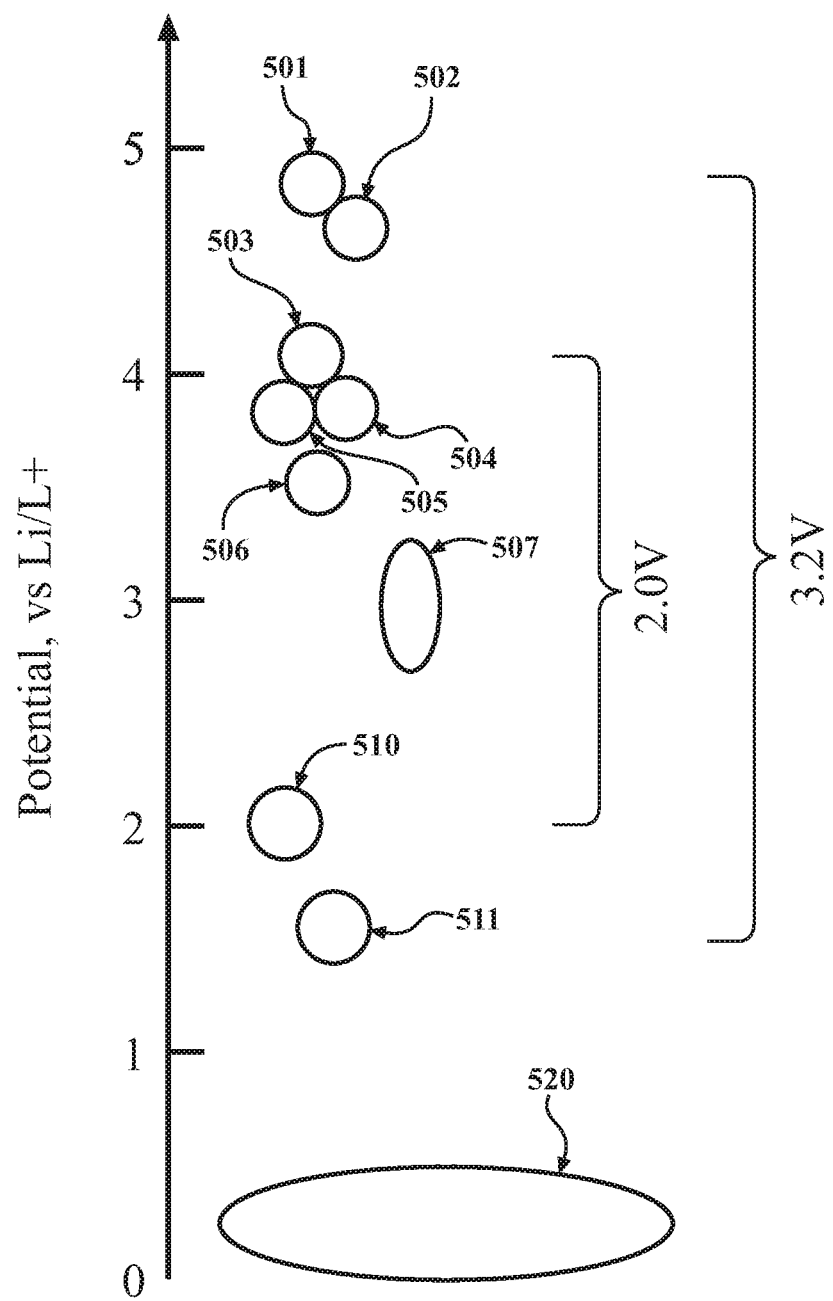
FIG. 5 is a schematic depiction of various anode and cathode active materials for a Li-ion cell, the various active materials positioned according to their redox potential.

FIG. 5 is a schematic representation of various desirable anode and cathode materials for lithium ion cells distributed along an axis according to their redox potential. Redox potentials are shown for useful cathode active materials, including: $LiNi_{0.5}Mn_{1.5}O_4$, 501; $LiCoPO_4$, 502; $LiMn_2O_4$, 503; $LiMn_{1/3}Ni_{1/3}Co_{1/3}O_2$, 504; $LiCoO_2$, 505; $LiFe(PO_4)$, 506; and $V_2O_5$, 507. Redox potentials are also shown for useful anode active materials: $Mo_6S_8$, 510; $Li_4Ti_5O_{12}$, 511; and graphite 520. The bracket labeled 2.0 V represents the electric potential window of prior art aqueous lithium ion electrolytes. The bracket labeled 3.2 V represents the electric potential window of the presently disclosed electrolyte composition as demonstrated by the cyclic voltammetry results of FIG. 2. As shown graphically in FIG. 5, the present electrolyte compositions enable the use of a wider array of electrode pairs employing a number of additional desirable anode and cathode active materials as compared to existing lithium ion electrolytes.

Thus, in some implementations of the Li-ion cell 100 of the present disclosure, the cathode 130 will have a redox potential at least 2.0 V more positive than that of the anode 120. In some implementations of the Li-ion cell 100 of the present disclosure, the cathode 130 will have a redox potential at least 2.5 V more positive than that of the anode 120. In yet other implementations of the Li-ion cell 100 of the present disclosure, the cathode 130 will have a redox potential at least 3.0 V more positive than that of the anode 120.

Figure 6:
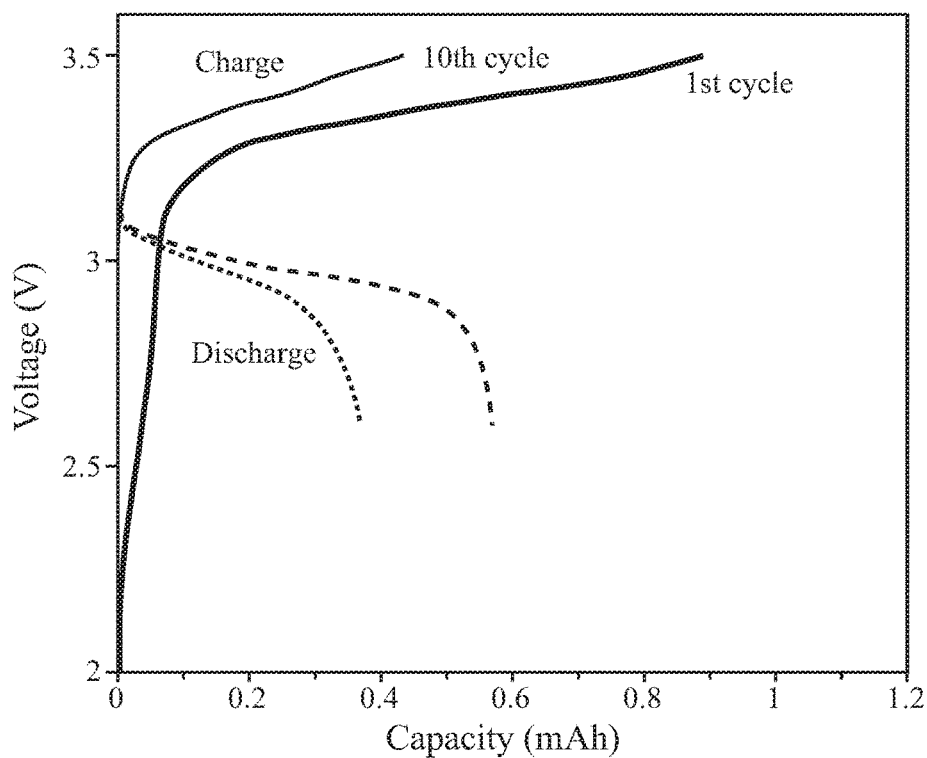
FIG. 6 is a graph of electric potential vs. capacity for first and tenth charge/discharge cycles of a battery of FIG. 1, where the electrolyte is LiTFSI/DEC/Water present at a 1:1:1 molar ratio.
Figure 7:
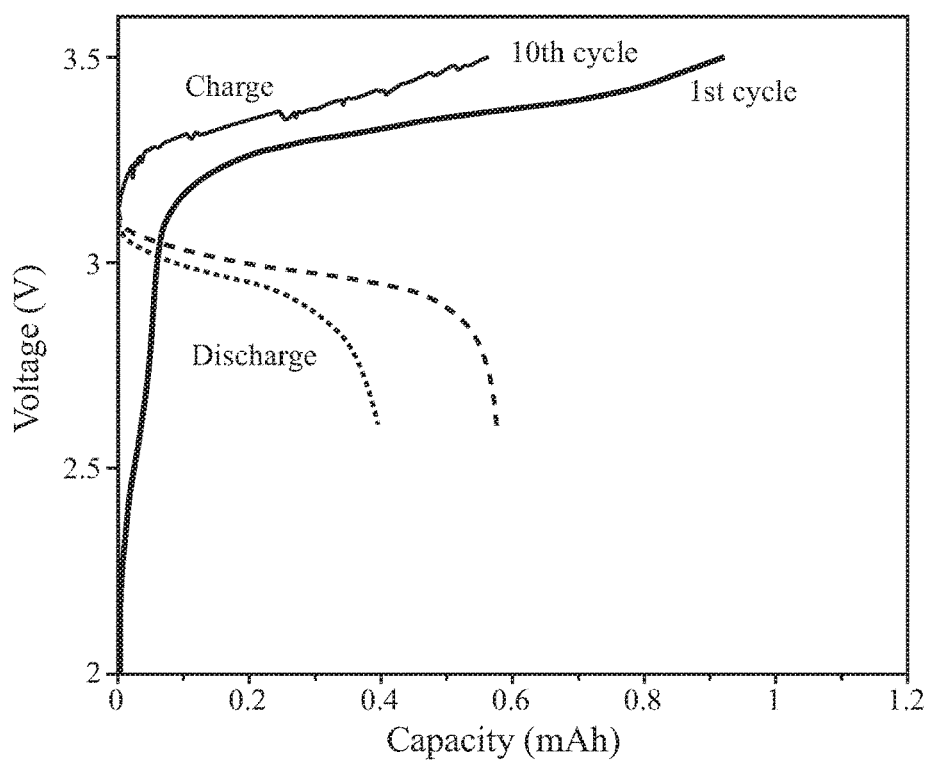
FIG. 7 is a graph of electric potential vs. capacity for first and tenth charge/discharge cycles of a battery of FIG. 1, where the electrolyte is LiTFSI/DMC/Water present at a 1:1:1 molar ratio.
Figure 8:
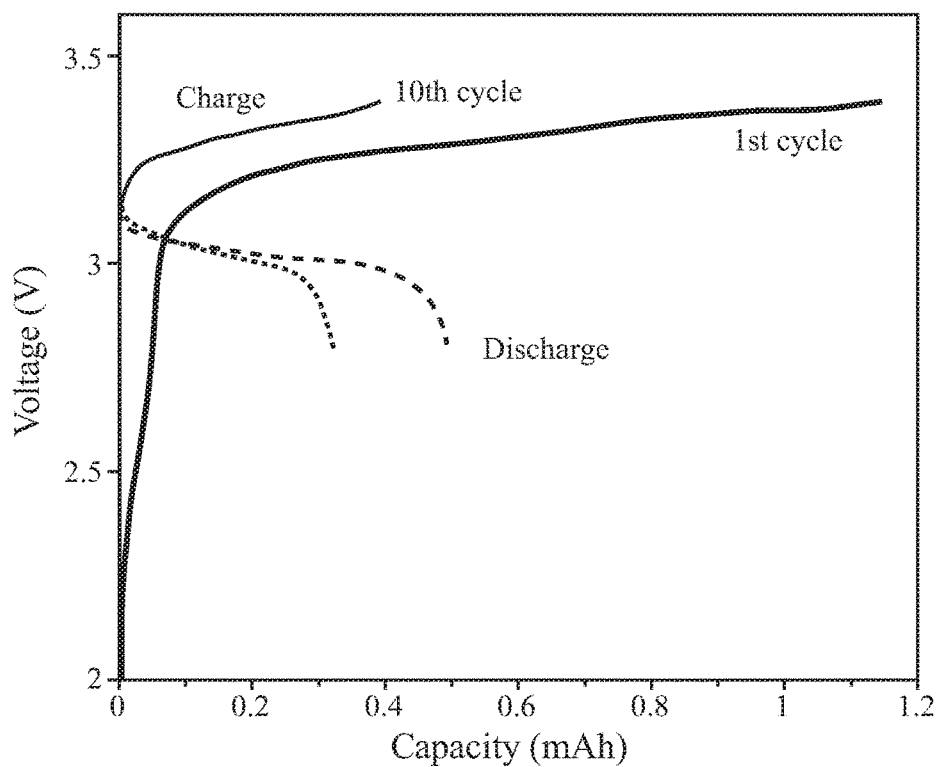
FIG. 8 is a graph of electric potential vs. capacity for first and tenth charge/discharge cycles of a battery of FIG. 1, where the electrolyte is LiTFSI/EC/Water present at a 1:1:1 molar ratio.
Figure 9:
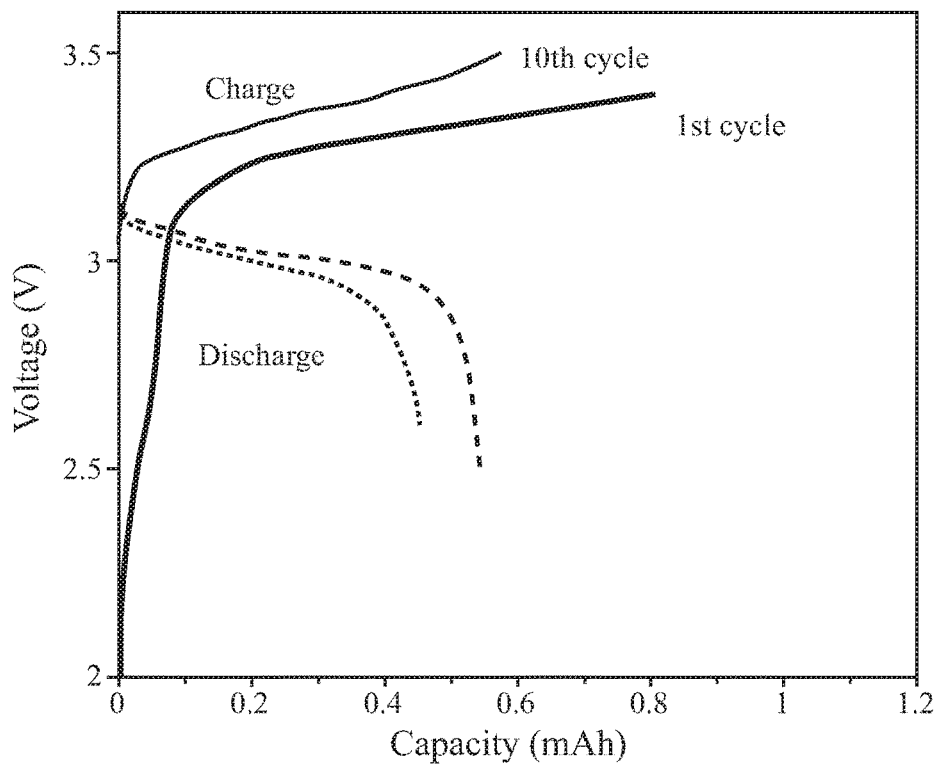
FIG. 9 is a graph of electric potential vs. capacity for first and tenth charge/discharge cycles of a battery of FIG. 1, where the electrolyte is LiTFSI/PC/Water present at a 1:1:1 molar ratio.

FIG. 6 shows first-cycle and tenth-cycle charge and discharge events for the Li-ion cell 100 of FIG. 4. The results, shown graphically in FIG. 6, confirm that the Li-ion cell 100 has an electronic potential of discharge of about 3 V, similar to the theoretical electric potential determined by the electrode pair 140. FIGS. 7-9 shows analogous results for Li-ion cells 100 similar to that of FIGS. 4 and 6, but having the DEC portion of the electrolyte composition 100 replaced with an equimolar amount of DMC, EC, or PC, respectively.

A comparison of the charge/discharge curves of FIGS. 6-9 shows that all four of the Li-ion cells 100 have stable discharge potential of about 3 V, near the theoretical discharge potential of the cell. A comparison of FIGS. 6-9 further shows that Li-ion cells 100 having the electrolyte compositions 150 with cyclic organic carbonates, EC or PC, have flatter plateaus at 3 V for a larger proportion of the cell's discharge capacity. In addition, the Li-ion cell 100 having the electrolyte composition 150 with the cyclic organic carbonate, PC, retains the greatest fraction of initial capacity between the first and tenth discharges. Thus it can be a reasonably proposed that those electrolyte compositions 150 of the present disclosure having cyclic organic carbonates may tend to have superior electrochemical properties in comparison to otherwise identical electrolyte compositions 150 or having non-cyclical organic carbonates.

The present invention is further illustrated with respect to the following examples. It needs to be understood that these examples are provided to illustrate specific embodiments of the present invention and should not be construed as limiting the scope of the present invention.

Examples 1-4. Preparation of Li-Ion Cell

A 2032-type coin cell is equipped with an anode having $Li_4Ti_5O_{12}$ combined with PVdF binder and conductive carbon on an electrically conductive current collector. The cell is further equipped with a cathode formed of $LiNi_{0.5}Mn_{1.5}O_4$ combined with PVdF binder and conductive carbon on an electrically conductive current collector. All of the anode and cathode are separated by a glass fiber separator infiltrated with an electrolyte composition. Four such cells are prepared, each having one of the following the electrolyte compositions: (i) LiTFSI:DEC:water at a 1:1:1 molar ratio, (ii) LiTFSI:DMC:water at a 1:1:1 molar ratio, (iii) LiTFSI:EC:water at a 1:1:1 molar ratio, or (iv) LiTFSI:PC:water at a 1:1:1 molar ratio. The cell having an electrolyte composition of LiTFSI:DEC:water at a 1:1:1 molar ratio is analyzed by cyclic voltammetry according to standard procedures, across an electric potential range of about −0.8 V to 6.2 V.

Charge/Discharge Evaluation.

Each of the four cells was charged at a rate of 1.0 $mA/cm^2$, with a cutoff of 3.4 or 3.5 volts; and discharged at a rate of 1.0 $mA/cm^2$, with a cutoff of 2.5-2.8 V. Evaluation temperature is 25° C. Potential is monitored, and the results for cells (i)-(iv) of Examples 1-4 are shown in FIGS. 6-9.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An electrolyte composition having:
 a lithium fluoroalkylsulfonyl salt selected from the group consisting of:
  lithium bis(fluorosulfonyl)imide (LiFSI);
  lithium bis(trifluoromethane)sulfonamide (LiTFSI);
  lithium bis(perfluoroethanesulfonyl)imide (LiBETI); and
  mixtures thereof;
 an organic carbonate selected from the group consisting of:
  dimethyl carbonate;
  diethyl carbonate;
  ethylene carbonate;
  propylene carbonate; and
  mixtures thereof,
  the organic carbonate present at a first molar ratio, relative to the lithium fluoroalkylsulfonyl salt, within a range of 0.1:1 to 50:1, inclusive; and
 water, present at a second molar ratio, relative to the lithium fluoroalkylsulfonyl salt, within a range of 1:1 to 5:1.

2. The electrolyte composition as recited in claim 1, wherein the first molar ratio is within a range of 0.5:1 to 20:1, inclusive.

3. The electrolyte composition as recited in claim 1, wherein the lithium fluoroalkylsulfonyl salt is present at a mole fraction of at least 0.3 of the electrolyte composition.

4. The electrolyte composition as recited in claim 1, wherein the lithium fluoroalkylsulfonyl salt comprises LiTFSI.

5. The electrolyte composition as recited in claim 1, wherein the organic carbonate comprises propylene carbonate.

6. A Li-ion cell comprising:
 an anode;
 a cathode; and
 an electrolyte composition placing the anode and the cathode in ionic communication with one another, the electrolyte composition comprising:
  a lithium fluoroalkylsulfonyl salt selected from the group consisting of:
   lithium bis(fluorosulfonyl)imide (LiFSI);
   lithium bis(trifluoromethane)sulfonamide (LiTFSI);
   lithium bis(perfluoroethanesulfonyl)imide (LiBETI); and
   mixtures thereof; and
  an organic carbonate selected from the group consisting of:
   dimethyl carbonate;
   diethyl carbonate;
   ethylene carbonate;
   propylene carbonate; and
   mixtures thereof,
   the organic carbonate present at a first molar ratio, relative to the lithium fluoroalkylsulfonyl salt, within a range of 0.1:1 to 50:1, inclusive; and
  water, present at a second molar ratio, relative to the lithium fluoroalkylsulfonyl salt, within a range of 1:1 to 5:1.

7. The Li-ion cell as recited in claim 6, wherein the first molar ratio is within a range of 0.5:1 to 20:1, inclusive.

8. The Li-ion cell as recited in claim 6, wherein the lithium fluoroalkylsulfonyl salt is present at a mole fraction of at least 0.3 of the electrolyte composition.

9. The Li-ion cell as recited in claim 6, wherein the lithium fluoroalkylsulfonyl salt comprises LiTFSI.

10. The Li-ion cell as recited in claim 6, wherein the organic carbonate comprises a cyclic organic carbonate.

11. The Li-ion cell as recited in claim 6, wherein the organic carbonate comprises at least one of dimethyl carbonate, diethyl carbonate, ethylene carbonate, and propylene carbonate.

12. The Li-ion cell as recited in claim 6, wherein the cathode has a redox potential at least 2.5 V more positive than a redox potential of the anode.

13. The Li-ion cell as recited in claim 6, wherein the cathode has a redox potential at least 3.0 V more positive than a redox potential of the anode.

14. The Li-ion cell as recited in claim 6, wherein the cathode comprises at least one of: $LiMn_2O_4$; $LiCoO_2$; $LiFe(PO_4)$; $LiMn_{1/3}Ni_{1/3}Co_{1/3}O_2$; $LiNi_{0.5}Mn_{1.5}O_4$; and $LiCoPO_4$.

15. The Li-ion cell as recited in claim 6, wherein the anode comprises at least one of: $Li_4Ti_5O_{12}$, $Mo_6S_8$, $Cu_2V_2O_7$, $TiS_4$, $NbS_5$, Li terephthalate ($C_8H_4Li_2O_4$), silicon, sulfur, and graphite.

16. The Li-ion cell as recited in claim 6, wherein the anode comprises $Li_4Ti_5O_{12}$ and the cathode comprises $LiNi_{0.5}Mn_{1.5}O_4$.

17. The Li-ion cell as recited in claim 6, wherein the anode comprises $Li_4Ti_5O_{12}$; the cathode comprises $LiNi_{0.5}Mn_{1.5}O_4$; the lithium fluoroalkylsulfonyl salt comprises LiTFSI; the organic carbonate comprises propylene carbonate; the first molar ratio is 1:1; and the second molar ratio is 1:1.

18. An electrolyte composition having:
 a lithium fluoroalkylsulfonyl salt;
 an organic carbonate, present at a first molar ratio, relative to the lithium fluoroalkylsulfonyl salt, within a range of 0.1:1 to 50:1, inclusive; and
 water, present at a second molar ratio, relative to the lithium fluoroalkylsulfonyl salt, within a range of 1:1 to 5:1;
wherein the lithium fluoroalkylsulfonyl salt is present at a mole fraction of at least 0.3 of the electrolyte composition.

* * * * *